(12) United States Patent
Peer

(10) Patent No.: US 11,582,916 B1
(45) Date of Patent: Feb. 21, 2023

(54) BALE WRAP REMOVAL SYSTEM

(71) Applicant: Shilo Peer, Artesian, SD (US)

(72) Inventor: Shilo Peer, Artesian, SD (US)

( * ) Notice: Subject to any disclaimer, the term of this patent is extended or adjusted under 35 U.S.C. 154(b) by 414 days.

(21) Appl. No.: 16/752,129

(22) Filed: Jan. 24, 2020

Related U.S. Application Data

(60) Provisional application No. 62/796,604, filed on Jan. 25, 2019.

(51) Int. Cl.
| | | |
|---|---|---|
| *A01F 29/01* | (2006.01) | |
| *A01F 29/00* | (2006.01) | |
| *B26D 1/03* | (2006.01) | |
| *B26D 3/08* | (2006.01) | |
| *B26D 7/06* | (2006.01) | |
| *B65B 69/00* | (2006.01) | |
| *A01F 15/07* | (2006.01) | |
| *A01D 87/12* | (2006.01) | |

(52) U.S. Cl.
CPC ............ *A01F 29/01* (2013.01); *A01D 87/127* (2013.01); *A01D 2087/128* (2013.01); *A01F 15/071* (2013.01); *A01F 29/005* (2013.01); *A01F 2015/076* (2013.01); *A01F 2015/0745* (2013.01); *B26D 1/03* (2013.01); *B26D 3/08* (2013.01); *B26D 7/06* (2013.01); *B65B 69/0025* (2013.01); *B65B 69/0033* (2013.01)

(58) Field of Classification Search
CPC ... B65B 69/0033; B65B 69/0025; B26D 7/06; B26D 3/08; B26D 1/03; A01F 29/01; A01F 2015/0745; A01F 2015/076; A01F 29/005; A01F 15/071; A01D 87/127; A01D 2087/128

See application file for complete search history.

(56) References Cited

U.S. PATENT DOCUMENTS

| | | | | |
|---|---|---|---|---|
| 3,880,305 | A | * | 4/1975 | Van Polen ........... A01D 87/127 294/107 |
| 4,821,486 | A | * | 4/1989 | Oiestad ................. A01F 15/071 53/170 |
| 5,242,121 | A | * | 9/1993 | Neier .................... A01D 87/127 241/101.76 |
| 2003/0192416 | A1 | * | 10/2003 | Platon ...................... A01K 5/00 83/924 |

(Continued)

FOREIGN PATENT DOCUMENTS

| | | | | |
|---|---|---|---|---|
| DE | 10036606 A1 | * | 3/2002 | ........... A01F 15/071 |
| EP | 3753392 A1 | * | 12/2020 | ........... A01D 87/127 |

(Continued)

*Primary Examiner* — Arpad F Kovacs
(74) *Attorney, Agent, or Firm* — Jeffrey A. Proehl; Woods, Fuller, Shultz & Smith, PC

(57) ABSTRACT

A wrapped bale handling apparatus configured to engage a bale and remove a wrap from the bale may include a bale support assembly configured to support the bale of material, with the bale support assembly having a support mode and a release mode. The support mode may be configured to support a bale by the bale support assembly, and the release mode may be configured to release the bale from being supported by the bale support assembly. The apparatus may further comprise a wrap cutting structure configured to cut the wrap in place on the bale and a wrap removal assembly configured to remove the wrap from the wrapped bale.

16 Claims, 9 Drawing Sheets

(56) References Cited

U.S. PATENT DOCUMENTS

| | | | |
|---|---|---|---|
| 2009/0108606 A1* | 4/2009 | Noonan | A01D 87/127 294/104 |
| 2016/0198633 A1* | 7/2016 | Machado | B66F 9/144 414/24.5 |
| 2017/0064908 A1* | 3/2017 | Sell | B26D 3/08 |
| 2018/0016049 A1* | 1/2018 | Schmitz | B65B 69/0025 |
| 2021/0045291 A1* | 2/2021 | O'Brien | A01K 5/002 |
| 2021/0051857 A1* | 2/2021 | Smith | A01F 29/005 |
| 2021/0059120 A1* | 3/2021 | Frey | A01D 87/127 |

FOREIGN PATENT DOCUMENTS

| | | | | |
|---|---|---|---|---|
| FR | 2484984 A1 | * | 12/1981 | B66F 9/06 |
| JP | 2008539138 A | * | 11/2008 | A01K 5/00 |
| WO | WO-8810064 A1 | * | 12/1988 | A01D 87/127 |
| WO | WO-2009137484 A1 | * | 11/2009 | A01D 87/127 |
| WO | WO-2015091377 A1 | * | 6/2015 | A01F 29/005 |

* cited by examiner

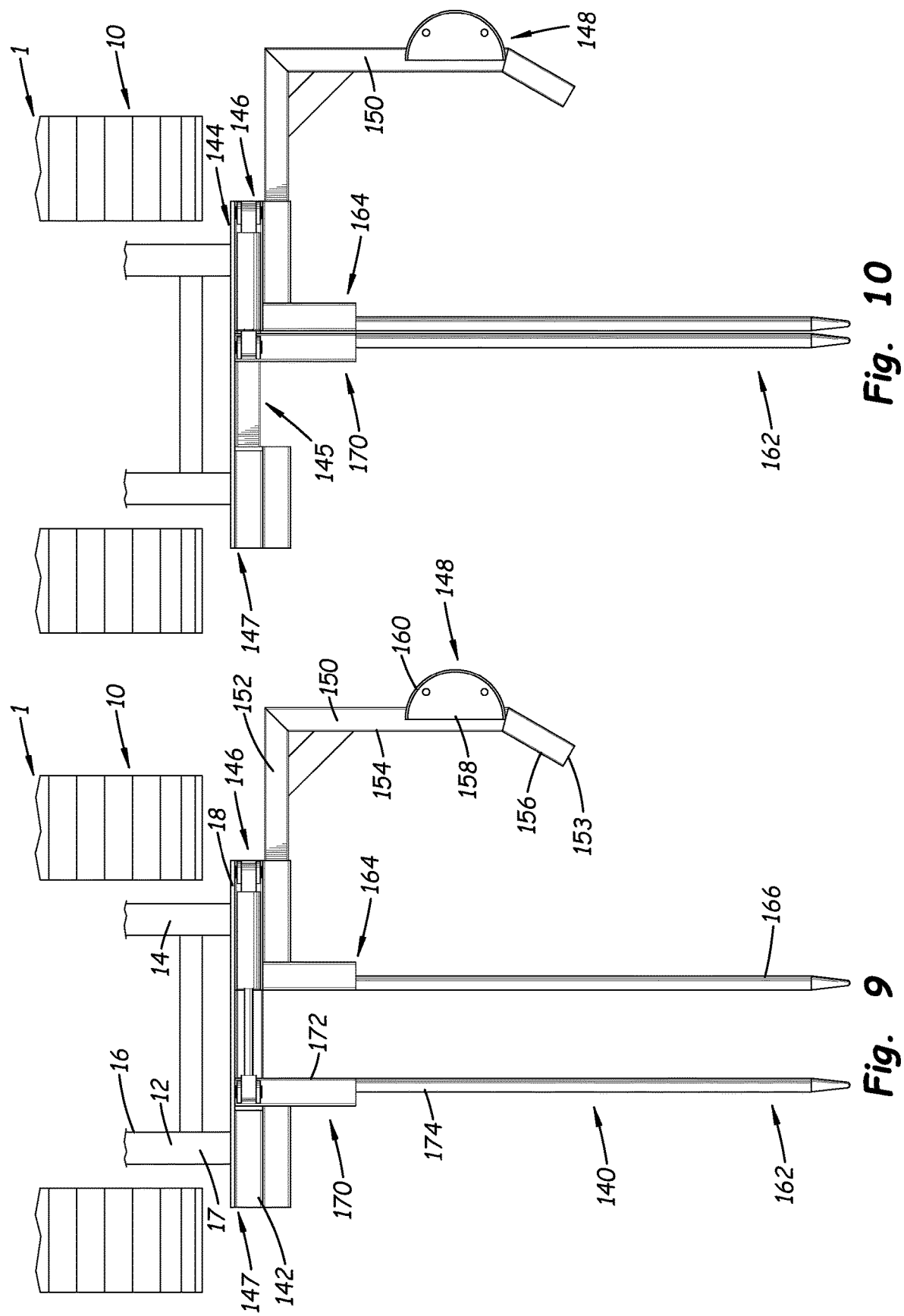

BALE WRAP REMOVAL SYSTEM

REFERENCE TO RELATED APPLICATION

This application claims the benefit of the priority of U.S. Provisional Patent Application No. 62/796,604, filed Jan. 25, 2019, which is hereby incorporated by reference in its entirety.

BACKGROUND

Field

The present disclosure relates to bale handling apparatus and more particularly pertains to a new bale wrap removal system for removing the wrap from a bale of material.

SUMMARY

In one aspect, the present disclosure relates to a wrapped bale handling apparatus configured to engage a bale and remove a wrap from the bale. The wrapped bale handling apparatus may comprise a bale support assembly configured to support the bale of material, with the bale support assembly having a support mode and a release mode. The support mode may be configured to support a bale by the bale support assembly, and the release mode may be configured to release the bale from being supported by the bale support assembly. The apparatus may further comprise a wrap cutting structure configured to cut the wrap in place on the bale and a wrap removal assembly configured to remove the wrap from the wrapped bale.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 9 is a schematic top view of an embodiment of a bale wrap removal apparatus mounted on a tractor and shown with the pinch elements in a spaced condition.

FIG. 10 is a schematic top view of the embodiment of FIG. 9 showing the bale wrap removal apparatus in a pinching condition.

DETAILED DESCRIPTION

Figure 1:
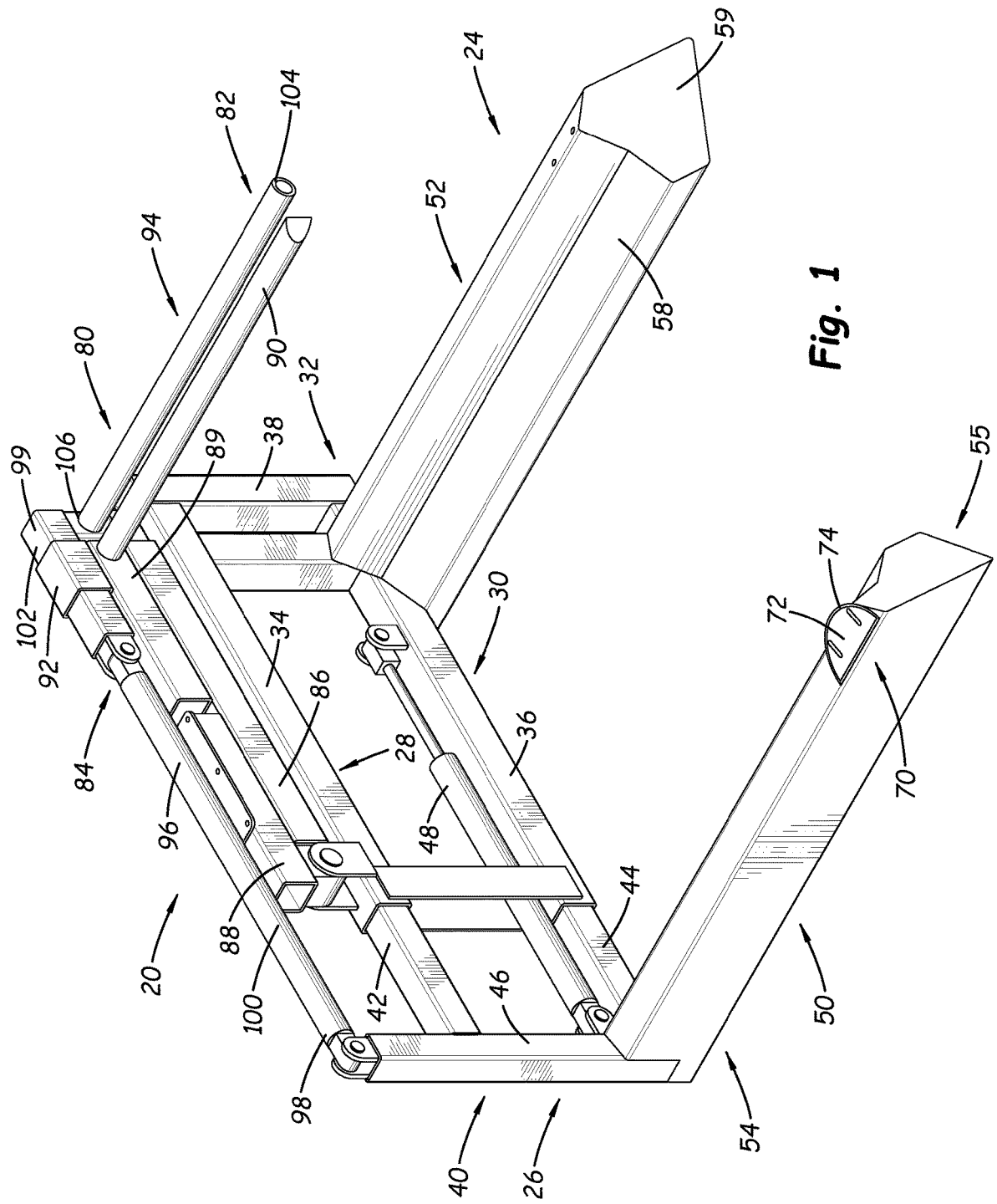
FIG. 1 is a schematic perspective view of one embodiment of a new bale wrap removal system in a support mode, according to the present disclosure.
Figure 2:
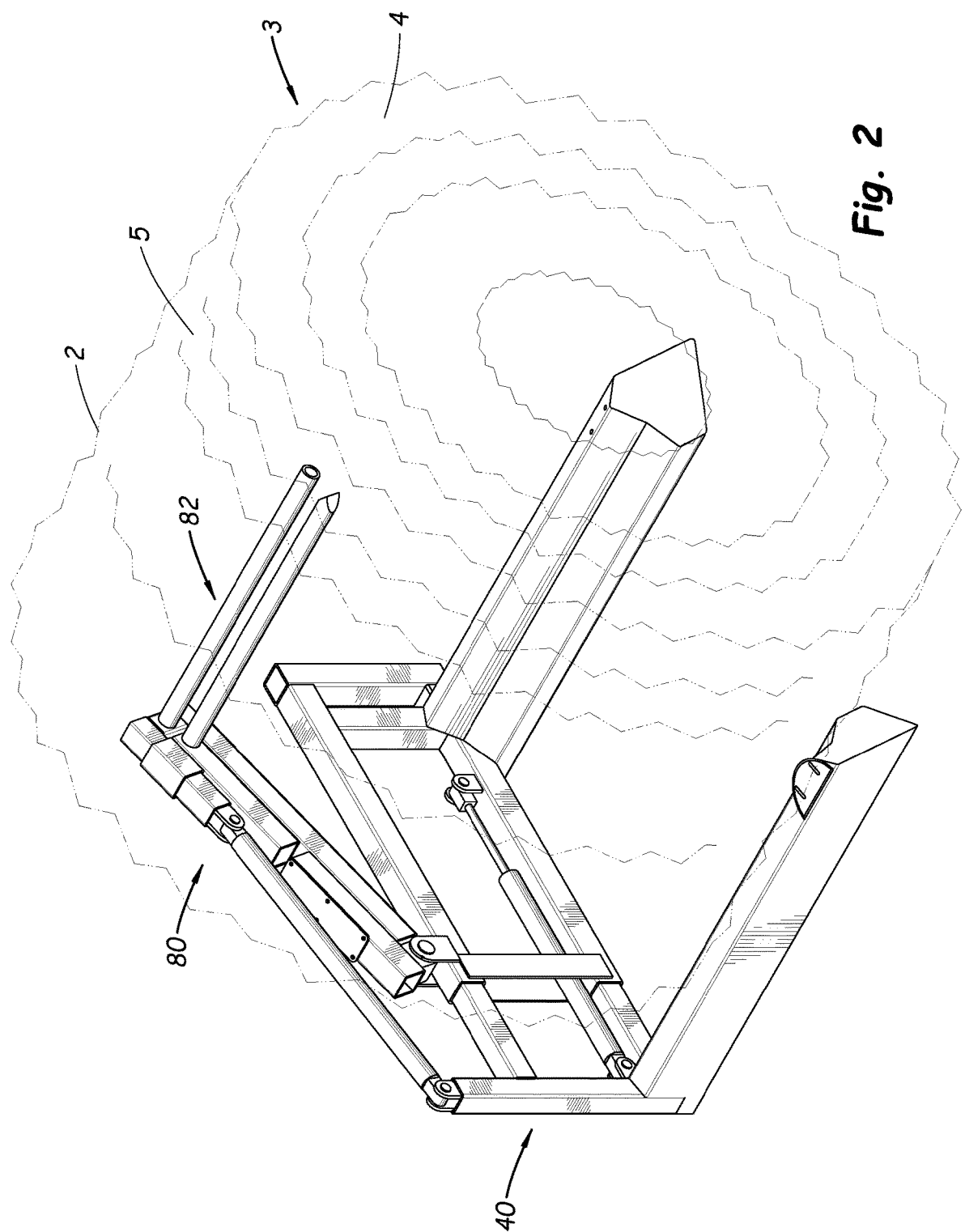
FIG. 2 is a schematic perspective view of the system engaging a bale and being moved out of the support mode toward a release mode, according to an illustrative embodiment.
Figure 3:
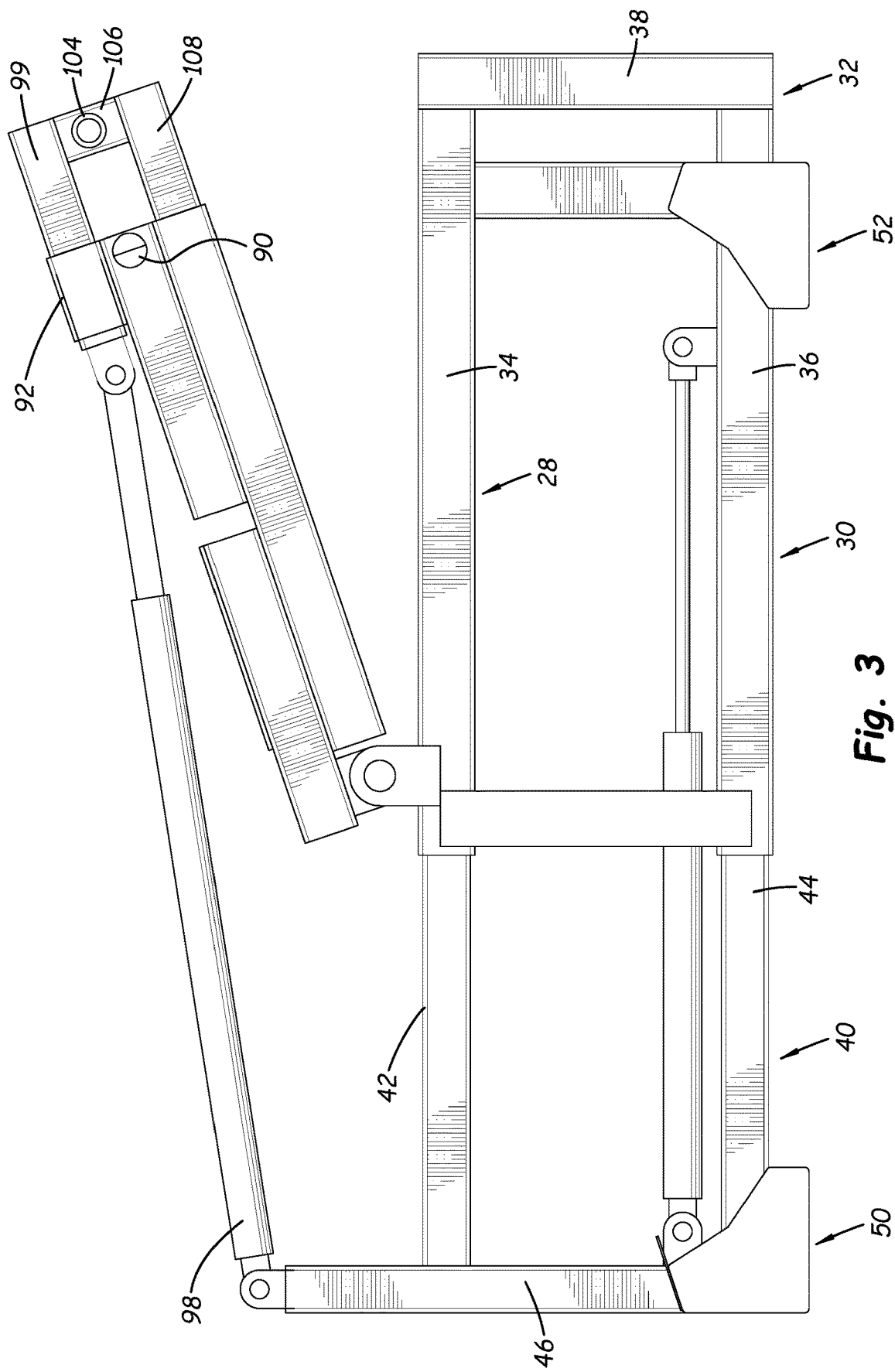
FIG. 3 is a schematic front view of the system in the release mode, according to an illustrative embodiment.
Figure 4:
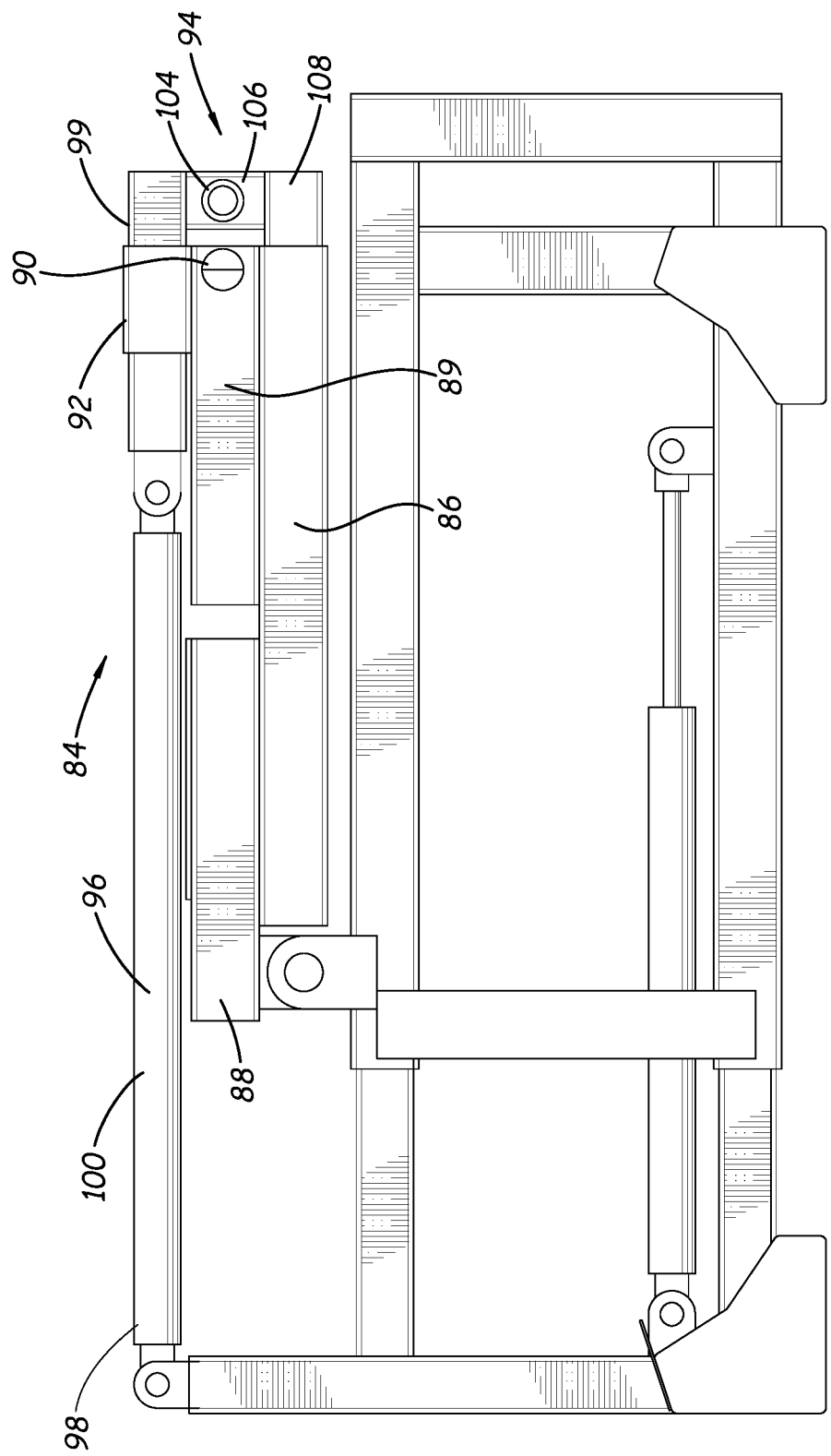
FIG. 4 is a schematic front view of the system in the support mode, according to an illustrative embodiment.
Figure 5:
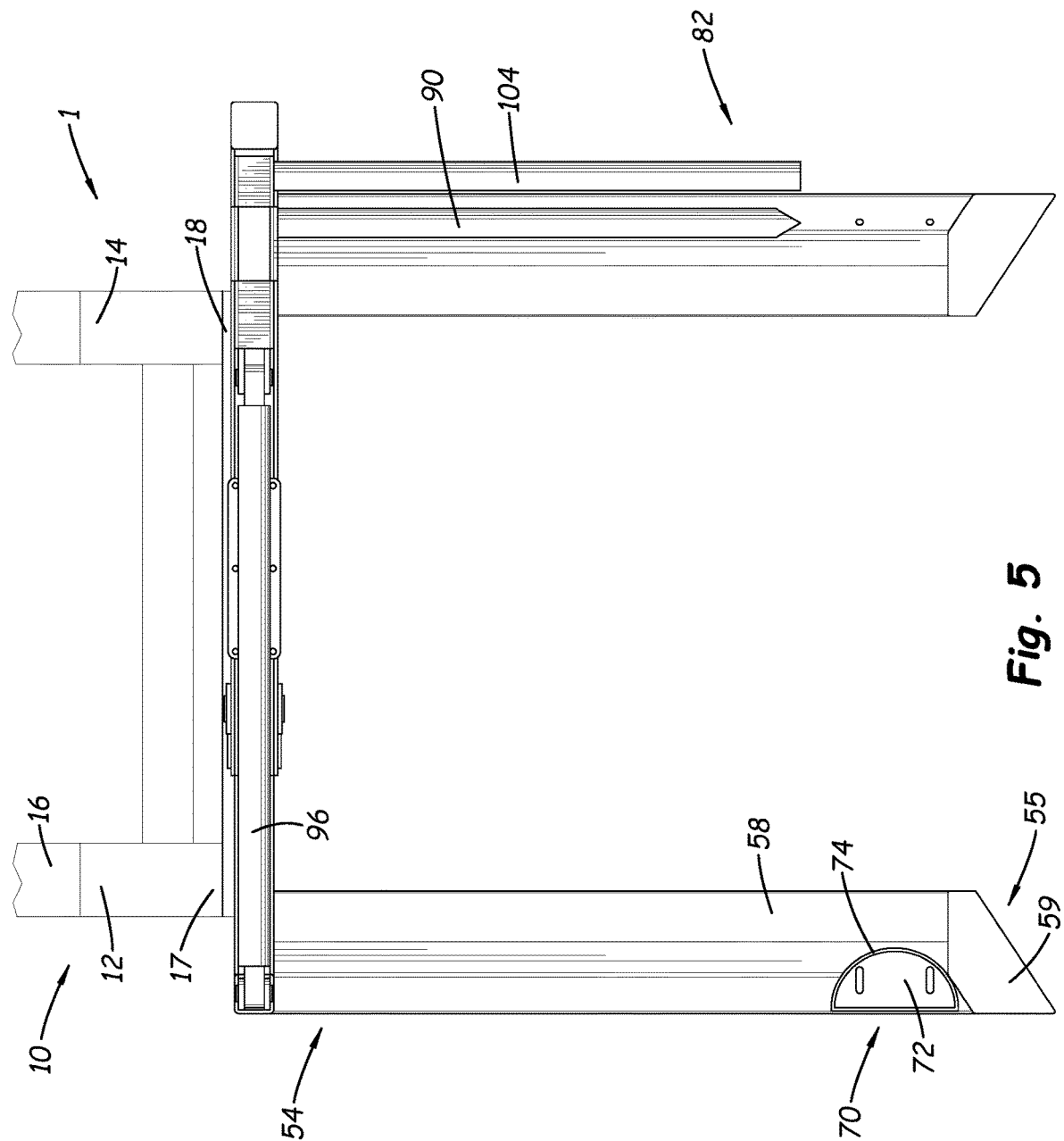
FIG. 5 is a schematic top view of the system showing the bale handling apparatus and a portion of a tractor on which the apparatus is mounted, according to an illustrative embodiment.

With reference now to the drawings, and in particular to FIGS. 1 through 10 thereof, a new bale wrap removal system embodying the principles and concepts of the disclosed subject matter will be described.

In some aspects, the disclosure relates to a system 1 for removing a wrap 2 from a bale 3. One highly suitable bale configuration for use with the system has a substantially cylindrical shape with substantially circular end faces 4 and a peripheral face 5 extending between the end faces which has a cylindrical shape. Wraps may be used to hold the baled material (e.g., straw, grass, etc.) together in the original shape and may be used to exclude environmental substances or pests and the construction of the wrap may depend upon the purpose for which the wrap is being employed. For example, suitable wraps 2 may be comprised of a fabric, and the fabric may be a continuous sheet material or film, or may be woven of fibers. In some implementations, the wrap may comprise a reticulated fabric or netting.

The system 1 may include a tractor 10 which may have at least one lift arm 12 raisable with respect to a ground surface upon which the tractor rests, and typically has a pair of the lift arms 12, 14 which are generally laterally spaced from each other and typically have an alignment which is aligned with the longitudinal direction of the tractor 10 which extends in a forward direction and rearward direction. The tractor 10 may also have a frame on which the lift arm or arms are pivotally mounted, and a plurality of wheels or tracks may be rotatably mounted on the frame to facilitate movement of the tractor across the ground surface. Each of the lift arms 12, 14 may have an inboard end 60 which is pivotally connected to the frame and an outboard end 17 which is located opposite of the inboard end on the respective lift arm. A mount 18 may be positioned on the outboard end of the pair of lift arms which may be of any suitable type, such as those various standardized mount configurations that permit the removable mounting of accessories.

Another aspect of the disclosure relates to a wrapped bale handling apparatus 20 which may be embodied as part of the system 1 or may be embodied as a separate or standalone apparatus. The wrapped bale handling apparatus 20 may be configured to engage a bale 3 and remove the wrap 2 from the bale. The apparatus 20 may be removably mounted on the tractor 10, and more specifically upon the mount 18 on the lift arms of the tractor which permits lifting of the apparatus 20 with respect to the ground surface and facilitates the engagement with a bale resting upon, for example, the ground surface or upon other bales in a stacked arrangement. Typically a bale is oriented such that the bale rests on a portion of the peripheral face 5 of the bale and the end faces 4 are generally vertically oriented.

In the illustrative embodiments, the wrapped bale handling apparatus 20 may include a mount frame 22 which is configured to mount on the mount 18 of the tractor, and in highly suitable embodiments permits removable mounting of the mount frame 22 on the mount 18.

The apparatus 20 may also include a bale support assembly 24 which is configured to support the bale 3 of baled material during at least some portions of the wrap removal processing. The bale support assembly 24 may be mounted on the mount frame 22 and the assembly 24 may have a support mode and a release mode. The support mode may be characterized by the apparatus 20 being capable of supporting a bale above the ground surface and may also be suitable to facilitate the lifting of the bale, for example, off of the ground surface or off of other bales. The release mode may be characterized by the apparatus 20 releasing the bale from being supported by the assembly 24 such that the bale may fall from the assembly 24, and to the ground surface below the apparatus 20. The bale support assembly 24 may extend outwardly from the mount frame 22 and may generally extend forwardly or in a forward direction with respect to the tractor 10 when the apparatus 20 is mounted on a tractor.

The bale support assembly 24 may include a support frame 26 which is mounted on the mount frame 22. The support frame 26 may have a support condition which generally corresponds to the support mode of the bale support assembly and a release condition which generally corresponds to the release mode of the assembly 24. The support frame 22 may have a lateral width which may be relatively smaller or narrower when the frame 26 is in the support condition and may be relatively larger or wider in the release condition of the frame 26. In some embodiments, the support frame 26 may telescope between the support and release conditions. The support frame 26 may include an upper member 28 and a lower member 30 which is generally positioned lower than the upper member 28. Illustratively, the upper and lower members may be oriented substantially parallel to each other and may be substantially horizontally oriented.

In greater detail, the support frame 26 may include a stationary frame portion 32 which may be substantially immovably mounted on the mount frame 22, and a movable frame portion 40 which is movably mounted on the stationary frame portion. The movable frame portion may have a support position (see, for example, FIGS. 1, 2, and 5) which generally corresponds to the support condition of the support frame, and a release position (see, for example, FIG. 9) which generally corresponds to the release condition of the support frame.

In some embodiments, the stationary frame portion 32 may include a stationary upper section 34 of the upper member 28, and a stationary lower section 36 of the lower member 30. A stationary upright section 38 may extend between and connect the stationary upper 34 and stationary lower 36 sections of the respective upper and lower members. The movable frame portion 40 may include a movable upper section 42 of the upper member 28 of the support frame 26, and in the illustrative embodiment the movable upper section may be telescopically received in the stationary upper section 34 such that the movable upper section is telescopically extendable from and retractable into the stationary upper section 34. The movable frame portion 40 may also include a movable lower section 44 of the lower member 30, and in the illustrative embodiments the movable lower section 44 may be telescopically received in the stationary lower section 36 such that the movable upper section is telescopically extendable from and retractable into this stationary lower section 36. The movable frame portion may also include a movable upright section 46 which extends between and connects the movable upper 42 and lower 44 sections of the respective upper and lower members of the support frame.

An actuator 48 may be mounted on the stationary frame portion 32 and the movable frame portion 40 in a manner such that extension of the actuator causes the movable frame portion to move toward the release position, such as from the support position, and retraction of the actuator causes the movable frame portion to move toward the support position, such as from the release position.

The bale support assembly 24 may further include a pair of support forks 50, 52 which may be laterally spaced from each other and extend from the support frame 26 in a generally forward direction relative to the tractor 10 when the apparatus 20 is mounted on the tractor. The support forks 50, 52 may have a support condition corresponding to the support condition of the support frame and a release condition corresponding to the release condition of the support frame. Illustratively, the support condition of the support forks may be characterized by the lateral spacing between the support forks being relatively smaller or narrower, and may be suitable to prevent a bale moving between the forks such that the bale may be supported by the forks. Further illustratively, the release condition of the forks may be characterized by the lateral spacing between the support forks being relatively larger or wider, and may be suitable to permit a bale to move between the forks such that the bale may be unloaded or dropped from the forks. Each of the support forks may have a proximal end 54 being mounted to the support frame and a distal end 55 located opposite of the proximal end on the respective fork.

In some embodiments, each of the support forks 50, 52 may include a first surface portion 58 toward the proximal end of the fork and a second surface portion 59 located toward the distal end of the fork. Illustratively, the first surface portions of the support forks 50. 52 may be oriented substantially parallel to each other. The second surface portion 59 of each support fork may be located on an outer end of the first surface portion 58, and the second surface portion may be oriented at an oblique angle with respect to the first surface portion. The second surface portions of the forks may extend forwardly and outwardly from the first surface portions such that the second surface portions of the support forks diverge away from each other toward the distal ends 55 of the forks.

The bale handling apparatus 20 may also include a wrap cutting structure 70 which is configured to cut the wrap while the wrap is in place on the bale, such as on or adjacent to the peripheral face 5 of the bale. The wrap cutting structure 70 may be mounted on the bale support assembly 24 and more specifically may be mounted on one of the support forks 50, 52. The wrap cutting structure may be positioned on one of the support forks in a manner that allows the structure 72 move along the wrap positioned on the peripheral face of the bale as the support fork is moved along the wrap, and the peripheral face of the bale so that the support forks are in a position to lift the bale. In some embodiments, the wrap cutting structure may be positioned toward the distal end 55 of one of the forks to facilitate the movement of the structure 70 along the peripheral face of the bale from one end face to the other end face. Illustratively, the wrap cutting structure may be mounted on the support fork toward the juncture of the first and second surface portions. The wrap cutting structure may include a cutting blade 72 which may have a cutting edge 74. The cutting edge may be generally arcuate in shape and the blade may be oriented such that the cutting edge is curved about a substantially vertical axis, although other orientations may be utilized.

The wrapped bale handling apparatus 20 may also include a wrap removal assembly 80 which is configured to remove the wrap from the wrapped bale, such as after the wrap cutting structure 70 has been moved along the width of the wrap on the peripheral face to sever the wrap from an face to end face of the bale. The wrap removal assembly 80 may include a wrap gripping structure 82 which is configured to grip a portion of the wrap as it is positioned about the wrapped bale adjacent to the peripheral face of the bale. The wrap gripping structure 82 may be configured to grip the portion of the wrap when the support frame is moved from the support condition toward the release condition and correspondingly the movable frame portion is moved from the support position toward the release position. The wrap gripping structure 82 may be configured to pinch the portion of the wrap as the wrap is in position about the wrapped bale to selectively and temporarily grip the wrap to facilitate removal from the bale.

The wrap gripping structure 82 may include a first grip component 84 and a second grip component 94 which cooperate to grip or pinch a portion of the wrap positioned on the bale. In greater detail, the first grip component 84 may be mounted on the support frame 26 and may be movable with respect to the frame 26 between a lowered position and a raised position. Generally, the lowered position of the first grip component may correspond to the support condition of the support frame and the raised position of the first grip component may correspond to the release condition of the support frame. The first grip component may be mounted on the stationary frame portion 32 of the support frame 26.

In greater detail, the first grip component 84 may include a first articulating element 86 which may be elongated with a first end 88 and a second end 89. In some embodiments, the first articulating element 86 may be oriented substantially horizontal in the lowered position of the first grip component and may be oriented more vertically in an inclined orientation in the raised position of the first grip component. The first articulating element may extend substantially laterally with respect to the support frame in the lowered position, and may be positioned over or above the stationary upper section 34 of the upper member of the support frame. The first end 88 of the first articulating element may be pivotally mounted on the stationary upper section of the upper member of the support frame. The first grip component 84 may further include a first pinch element 90 which is configured to penetrate a bale supported on the support frame 26 such as when the support frame is in the support condition. The first pinch element 90 may be positioned to penetrate the bale at a location that is close to the peripheral face of the bale so as to be located relatively close to an inner surface of the wrap about the bale. The first pinch element 90 may extend substantially longitudinally with respect to the support frame and may be substantially horizontally oriented in the lowered position as well as the raised position of the first grip component. The first pinch element may be mounted on the second end 89 of the first articulating element 86, and may comprise a bale spike with a tapered free end that facilitates penetration of the element 90 into the material of the bale.

The first grip component 84 may include an alignment sleeve 92 which is mounted on the first articulating element 86 and may be located toward the second end 89 of the element 86, such as above the articulating element 86 when the first grip component 84 is in the lowered position. The alignment sleeve may define a passage which extends substantially parallel to a longitudinal axis of the first articulating element 86.

The second grip component 94 may be mounted on the support frame 26 and may be movable with respect to the frame 26 between a lowered position and a raised position. The lowered position of the second grip component 94 may correspond to the support condition of the support frame 26 and the raised position of the second grip component may correspond to the release condition of the support frame. The second grip component may be mounted on the movable frame portion of the support frame.

In greater detail, the second grip component 94 may include a second articulating element 96 which may be elongated with a first end 98 and a second end 99. The second articulating element may be oriented substantially horizontally in the lowered position of the second grip component and may be oriented at an incline to the horizontal in the raised position of the grip component 94. The second articulating element 96 may extend substantially laterally with respect to the support frame 26 in the lowered position, and may be positioned over the first articulating element 86 when the second grip component is in the lowered position. The first end of the second articulating element may be pivotally mounted on the movable upper section 42 of the movable frame portion 40 such that movement of the movable frame portion with respect to the stationary frame portion causes movement of the second grip component as well as the first grip component via a mechanism which will be illustratively described.

The second articulating element 96 may include a first section 100 which is generally adjacent to the first end 98 of the element 96, and the first end may be located on the first section such that the first section is pivotally mounted to the movable frame portion. The second articulating element may also include a second section 102 located adjacent to the second end 99 of the second articulating element, and the second end may be located on the second section 102. The second section 102 may be pivotally mounted on the first section 100, and the second section may be removably received in the passage of the alignment sleeve 92 of the first grip component. The second section 102 may be slidably movable in the passage of the alignment sleeve. In some embodiments, sliding movement of the second section with respect to the sleeve 92 may be limited by the presence of a stop 106 protruding from the second section adjacent to the second end 99 which may prevent the movement of the second end 99 through the passage of the sleeve 92.

The second grip component 94 may also include a second pinch element 104 which may extend substantially longitudinally with respect to the support frame 26. The second pinch element may be substantially horizontally oriented in the lowered position and in the raised position of the second grip component. The second pinch element 104 may be mounted on or adjacent to the second end 99 of the second articulating element, and may, for example, be mounted on the stop 106 or form a stop. The second pinch element may have a structure similar to a spike although the second pinch element is not intended to penetrate the bale during operation, but instead to be positioned along an outer surface of the wrap about the peripheral face of the bale. In some embodiments, the second grip component 94 may include an auxiliary element 108 to provide additional movement guidance for the second articulating element 96 and the second pinch element 104. Illustratively, the auxiliary element 108 may be mounted on the stop 106 and may be slidably received in a portion of the first articulating element 86 such that the element 108 is telescopic with respect to element 86.

In some embodiments, at least one of the pinch elements 90, 104 may have structure that facilitates the gripping of the wrap between the pinch elements produced by the movement of the pinch elements toward each other and thereby enhance the grip achieved on the portion of the wrap positioned between the pinch elements. Illustratively, an elastomeric material may be mounted on one of the pinch elements at least on a side of the one pinch element that is oriented toward the other pinch element to enhance the pinching effect.

Optionally, the wrap removal assembly 80 may further include a wrap pulling structure configured to pull a portion of the wrap away from the bale to facilitate removal of the wrap from the bale as the support frame 26 moves from the support condition to the release condition as the bale support assembly 24 transfers from the support mode to the release mode and the bale supported by the frame 26 is permitted to drop from the support assembly 24 to the ground surface. Illustratively, the wrap pulling structure may be mounted on the wrap gripping structure 82, and more particularly on the first section 100 of the second articulating element 96.

In an illustrative operation sequence for the system, the bale handling apparatus 20 may be engaged or mounted on a tractor 10, and more specifically on the mount 18 provided on the outboard ends of the lift arms 12, 14. Hydraulic power from the tractor 10 may be utilized to operate the apparatus 20, and suitable connections may be made between the hydraulic power system of the tractor and controls and actuators of the apparatus. The tractor may be maneuvered so that a wrapped bale resting on the ground surface (or other bales) is positioned forwardly of the bale handling apparatus. Suitably, the tractor and the apparatus 20 face or are oriented toward one of the end faces 4 of the wrapped bale.

Initially, the bale support assembly 24 may be moved to the support mode if not already. The tractor and the lift arms may be manipulated to position elements of the apparatus 20 in a suitable relationship to the end face of the bale so that the elements of the apparatus will engage the appropriate portions of the bale when the apparatus 20 is moved forwardly to engage the bale. For example, the support forks 50, 52 may be positioned at a vertical level that is relatively lower than portions of the bale such that the forks are able to move into a position below and adjacent to the wrapped bale so that the forks are positioned to support the bale when the apparatus 20 is moved forwardly to engage the bale. Further, the wrap engagement member of the wrap pulling structure of the wrap removal assembly 80 may be positioned with respect to the bale to penetrate the bale at a location relatively close to and inward from the bale wrap when the apparatus 20 is moved forwardly to engage the bale. Also, the first pinch element 90 of the wrap removal assembly 80 may also be positioned with respect to the bale to penetrate the bale at a location relatively close to and inward from the bale wrap, while the second pinch element 104 may be positioned to be located outside of the wrap and bale when the apparatus 20 is moved forwardly to engage the bale.

As the apparatus 20 is moved forwardly to engage the bale, the cutting blade 72 of the wrap cutting structure 70 on one of the support forks may be pressed against the wrap on the peripheral face of the bale such that the forward movement of the apparatus by the tractor also moves the cutting blade along and across the wrap to sever the wrap from one end face to the other end face of the bale.

The apparatus 20 may be moved by the tractor and lift arms to a location where the unwrapped bale and contents are to be deposited. This may be accomplished, for example, by raising the support frame 26 and support forks 50, 52 upwardly away from the ground to facilitate movement of the bale.

Once the bale has been positioned above its desired location (e.g., on the ground surface), removal of the wrap from the bale may be commenced. The actuator 48 on the support frame may be actuated to cause the support frame to move from the support condition to the release condition such as by moving the movable frame portion 40 with respect to the stationary frame portion 32 to thereby move the support forks from the support condition to the release condition in which the spacing between the forks is increased. As the movable frame portion moves with respect to the stationary frame portion, the second articulating element 96 of the second grip component 94 is moved with respect to the first articulating element 86 such that the second pinch element 104 is moved toward the first pinch element 90 to grip or pinch a portion of the wrap between the first 90 and second 104 pinch elements. Movement of the second section 102 of the second articulating element 96 in the alignment sleeve 92 may continue until the first pinch element engages with the second pinch element or a stop 106 resists further movement of the movable frame portion with respect to the stationary frame portion. When the movement of the second section 102 of the second articulating element with respect to the first articulating element is effectively stopped, then the second articulating element 96 is caused to pivot upwardly which may in turn cause the first articulating element 86 to also pivot upwardly by virtue of the connection between the second section 102 and the alignment sleeve 92 of the respective articulating elements.

The pivot movement of the first articulating element tends to move the first and second pinch elements upwardly and also away from the bale and the spreading support forks to tend to pull a portion of the severed wrap away from the bale. In embodiments including a wrap pulling structure, pivot movement of the second articulating element may tends to cause the wrap pulling structure lift a portion of the severed wrap away from the bale. The first and second pinch elements retain a grip on the wrap as the wrap engagement member and the pinch elements move upwardly and away from the bale so that the wrap is effectively retained on the apparatus 20.

Once the wrap has been separated from the bale to some degree by the wrap removal assembly 80, the apparatus 20 may be moved away from the bale to further separate the wrap from the bale (if necessary). Movement of the support frame from the release condition back to the support condition by moving the movable frame portion from the release position to the support position effectively permits the first 84 and second 94 grip components to move from the raised position to the lowered position and move the first and second pinch elements away from each other to release the grip on the wrap so that the wrap can be disengaged from the apparatus 20 and, for example, dropped onto the ground surface for disposal. Further, the apparatus 20 may be tilted downwardly on the lift arms 12, 14 so that the first 90 and second 104 pinch elements, as well as the wrap engagement member, are angled downwardly to facilitate the release of the wrap from the apparatus 20.

Figure 6:
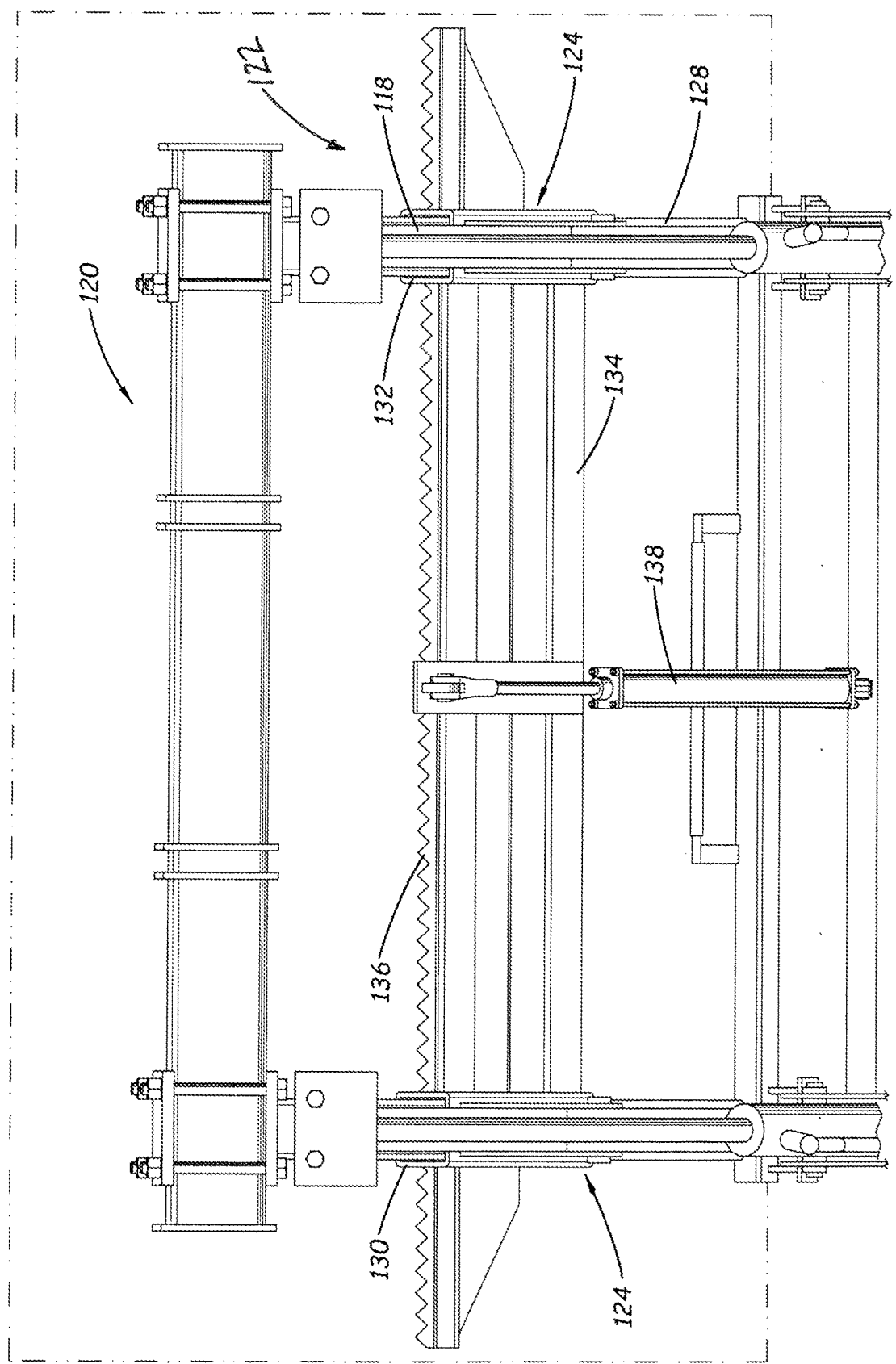
FIG. 6 is a schematic top view of another embodiment of a bale wrap removal system according to the present disclosure.
Figure 7:
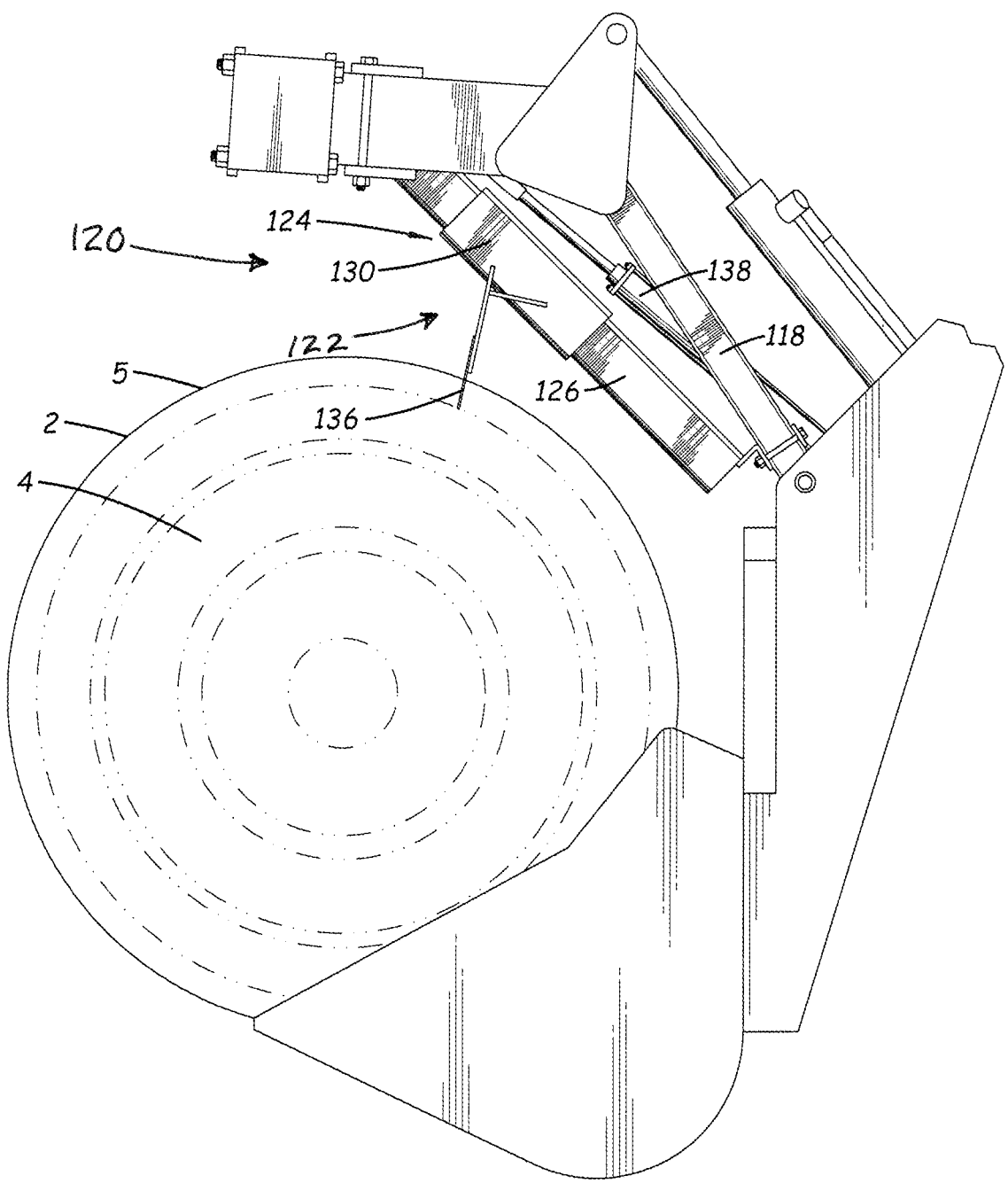
FIG. 7 is a schematic side view of the embodiment of the bale wrap removal system as shown in FIG. 6 in relationship to a bale, according to the present disclosure.
Figure 8:
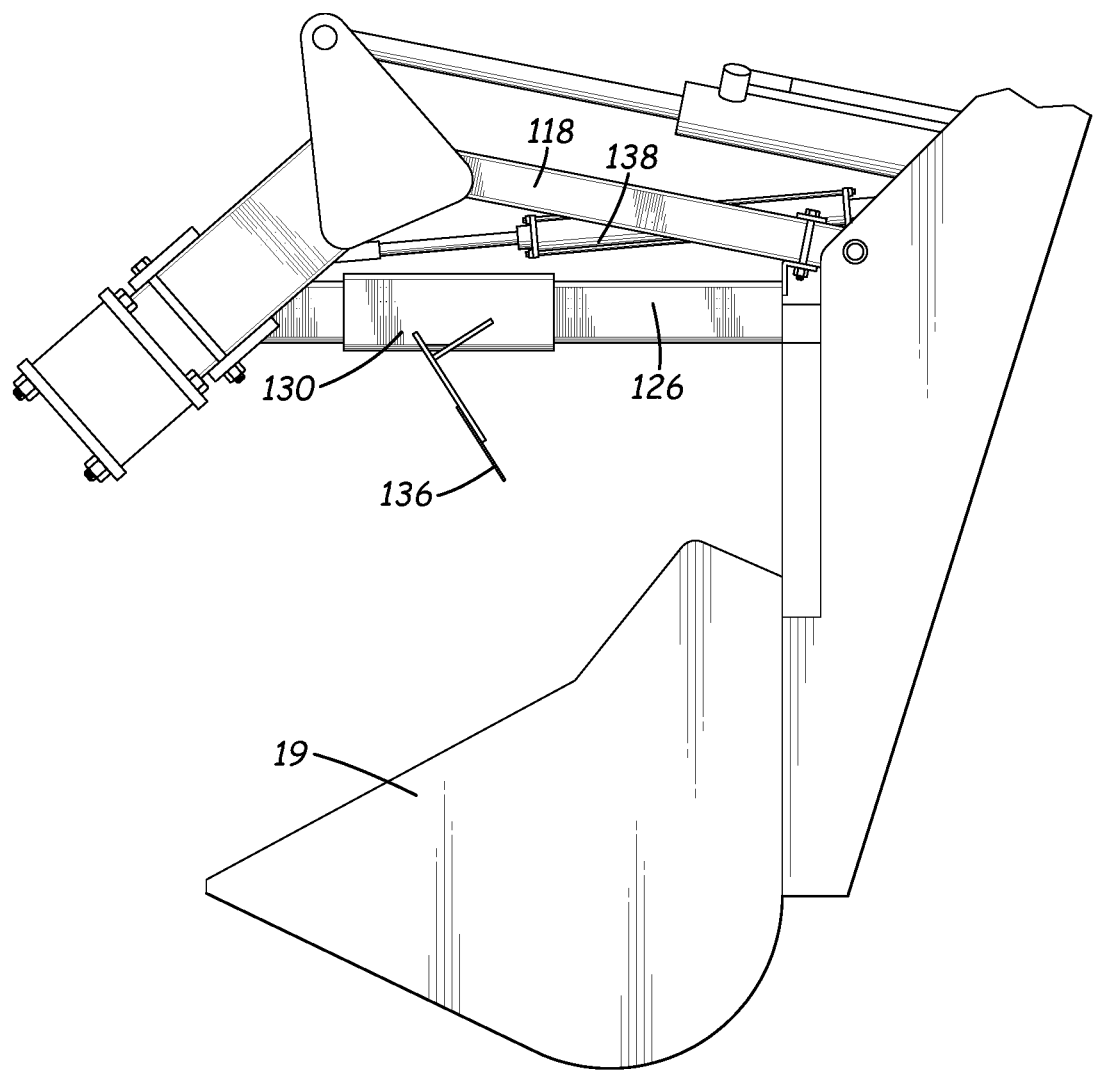
FIG. 8 is a schematic side view of the embodiment of the bale wrap removal system as shown in FIG. 6, according to the present disclosure.

In another aspect, the disclosure relates to a system 120 for removing the wrap from a bale which may also utilize a tractor with a frame and one or more lift arms, as illustratively shown in FIGS. 6 through 8. The system 120 may also utilize a bucket 19 such as the type conventionally mounted on the lift arms of a tractor. One or more grapple arms 118 may be mounted on the lift arms (or the bucket) to pivot in a clamshell manner in combination with the bucket to grasp items, such as a bale, between the grapple arms and the bucket. For example, the peripheral face 5 of the bale may be positioned on or against the bucket 19 and the grapple arms may be pivoted toward the bucket to grasp or pinch the bale between the arms and the bucket.

The system 120 may include a wrap release apparatus 122 which is configured to engage a bale which is at least partially positioned on the bucket 19 and grasp by the grapple arm or arms and sever the wrap to about the bale. The wrap release apparatus 122 may include a guide frame 124 which includes a pair of guide members 126, 128, and each of the guide members may be mounted on us respective lift arm 12, 14. Each of the guide members 126, 128 may extend between an inner portion and an outer portion of a lift arm, and may extend substantially linearly or straightly between the mounting points. The wrap release apparatus 122 may also include a pair of slider mounts 130, 132 with each of the slider mounts being mounted on one of the guide members 126, 128. Each of the slider mounts 130, 132 may be slidable along the respective guide member, and in some embodiments each of the slider mounts may comprise or form a sleeve which slidably receives a portion of the guide member upon which it is mounted. One or more linking members 134 may be joined to and link the slider mounts such that the slider mounts are linked and movement of the slider mounts on the guide members is coordinated.

The wrap release apparatus 122 may also include a cutting blade 136 which is mounted on the pair of slider mounts to move with the slider mounts. The cutting blade 136 may be elongated to bridge between the slider mounts 130, 132, and may be mounted on the slider mounts and/or the linking members 134. The cutting blade may have a cutting edge, and in some embodiments the cutting edge may be serrated and may be generally arcuate in shape such that a middle portion of the cutting edge protrudes further from the slider mounts than the end portions of the cutting edge. The cutting edge may lie in a plane that extends at an oblique angle with respect to the axes of the movement of the slider mounts on the guide members. The apparatus 122 may further include an actuator 138 which is mounted on the blade or the linking members or the slider mounts and a point on the structure associated with the lift arms such that extension and retraction of the actuator causes the cutting blade 136 to move along the guide frame and into contact with the bale held by the grapple arm and the bucket.

In another aspect, the disclosure relates to a bale wrap removal apparatus 140, as illustratively shown in FIGS. 9 and 10, which is configured to engage a bale and facilitate removal of wrap from the bale, but may not have the capability of lifting a bale off of the ground. In greater detail, the apparatus 140 may include a mount frame 142 which may be configured to mount on the mount 18 of a tractor, and may be removably mounted on the mount 18 of the tractor. The mount frame 142 may have a rear 144 for orienting toward the tractor (when the mount frame is mounted on the tractor) and a front 145 for orienting away from the tractor. The mount frame 142 may extend laterally between a first lateral side 146 of the frame 142 and a second lateral side 147.

The bale wrap removal apparatus may also include a wrap cutting structure 148 which is configured to cut the wrap when the wrap is in place on the bale. The wrap cutting structure 148 may be mounted on the mount frame 142, and may be located toward one of the lateral sides of the frame. In greater detail, the wrap cutting structure 148 may include an outboard arm 150 which extends generally forwardly from the mount frame, and may be positioned toward the first lateral side 146 of the frame 142. The outboard arm 150 may have an inner end 152 mounted on the mount frame and an outer end 153 positioned opposite of the inner end and which may form a free end capable of moving along the exterior surface of the wrap positioned on a bale. The outboard arm 150 may have an inner section 154 and an outer section 156, and the outer section 156 may extend along an axis oriented at an oblique angle to an axis of the inner section to facilitate an initial contact with the wrap on a bale without the outer end of the arm becoming entangled with the wrap or the baled material of the bale and facilitate subsequent sliding movement of the outboard arm along the width of the wrap.

The wrap cutting structure 148 may also include a cutting blade 158 which is mounted on the outboard arm 150 at a location that is generally spaced from the inner end 152 of the arm. The cutting blade 158 may have a cutting edge 160 which may be oriented laterally outwardly away from the mount frame 142 to facilitate contact between the cutting edge 160 and the wrap as an outer surface of the outboard arm is slid along the wrap on a bale. The cutting edge 160 may be arcuate in shape, and may be curved about a substantially vertical axis. The cutting blade of the cutting structure 148 may be mounted on the inner section 154 of the outboard arm, and may be positioned toward a juncture between the inner 154 and outer 156 sections of the arm 150 to facilitate the pressing of the blade 158 against the outer surface of the wrap as the arm is moved along the exterior of the bale.

The bale wrap removal apparatus 140 may also include a wrap gripping structure 162 which is configured to grip a portion of the wrap as it is wrapped about the bale. The wrap gripping structure 162 may include a stationary structure 164 which is mounted on the mount frame 142 to be relatively stationary with respect to the frame 142. The stationary structure 164 may be positioned on the front 145 of the frame, and may include a first pinch element 166 which extends forwardly from the mount frame for penetrating a bale positioned forwardly of the mount frame 142. The first pinch element 166 may be substantially horizontally oriented when the apparatus 140 is being utilized to facilitate positioning of the element 166 alongside a portion of the wrap on the bale. In some embodiments, the first pinch element 166 may be mounted on the mount frame at a location which is substantially centrally located between the first 146 and second 147 lateral sides of the mount frame.

Illustratively, the first pinch element may comprise a bale spike with a tip which is tapered in shape.

The wrap gripping structure 162 may also include a movable structure 170 which is mounted on the mount frame 142 in a manner permitting movement of the movable structure 170 with respect to the mount frame, and typically with respect to the stationary structure. The movable structure may include a movable subframe 172 which is movably mounted on the mount frame, and may be movable in a lateral direction relative to the first 146 and second 147 lateral sides of the mount frame. The movable subframe 172 may be movable for a portion of the distance between the first and second lateral sides of the frame 142, and in some embodiments the subframe 172 may be movable between a location adjacent to the first pinch element 166 of the stationary structure and the second lateral side 147 of the mount frame.

The movable structure 170 may also include a second pinch element 174 which is configured to penetrate a bale which is positioned forwardly of the mount frame. The second pinch element 174 may extend forwardly from the mount frame and may be substantially horizontally oriented when the apparatus 140 is being utilized to engage a bale. The second pinch element 174 may be oriented substantially parallel to the first pinch element 166, and may be movable with the movable subframe 172 with respect to the first pinch element 166 of the stationary structure 164 to vary and adjust a spacing between the elements 166, 174. The pinch elements may be moved between a spaced condition in which the pinch elements are spaced from each other, and a pinch condition in which the pinch elements are positioned substantially against each other. Illustratively, a spacing of approximately 10 inches may exist between the pinch elements in the spaced condition. The second pinch element 174 may comprise a bale spike with a tapered tip.

In use, the bale wrap removal apparatus 140 may be utilized to cut or sever the wrap which is in place about a bale and then assist in the separation of the severed wrap from the baled material of the bale. Illustratively, the tractor on which the mount frame 142 is mounted may be oriented in position such that the cutting blade 158 on the outboard arm 150 is positioned against the wrap at or adjacent to one edge of the wrap. The tractor may be maneuvered such that the cutting edge 160 of the blade 158 is pressed against the wrap with sufficient force to cause the blade to penetrate and sever the wrap, and then the tractor may be further maneuvered to advance the cutting edge of the blade 158 along the width of the wrap toward the opposite edge of the wrap to completely, or substantially completely, sever the wrap from one edge to the opposite edge of the wrap.

Upon completion of the severing of the wrap, with the pinch elements separated and spaced away from each other, the tractor may be maneuvered to position the tip of one of the pinch elements 166, 174 with respect to the bale such that forward movement of the apparatus 140 (e.g., by the tractor) causes the one pinch element to penetrate the bale at a location relatively close to and inward from the bale wrap. Suitably, this positioning of the one pinch element also positions the other pinch element outside of the wrap on the bale such that a portion of the bale wrap is located between the pinch elements as the pinch elements are advanced forwardly with respect to the bale.

The pinch elements 166, 174 may then be brought together by movement of the movable structure 170 with respect to the stationary structure 164 to engage and "pinch" a portion of the wrap between the elements 166, 174 and thereby retain the portion between the elements without significant slippage. Subsequent movement of the pinch elements away from the bale, such as by upward movement or lateral movement of the pinch elements with respect to the bale (e.g., via maneuvering of the tractor), then tends to pull the portion of the wrap away from the baled material of the bale as the weight of the baled material tends to keep the baled material in the same position as the portion of the wrap is being pulled away. Continuing movement of the pinch elements may further separate the severed wrap from the baled material until the wrap is free of the main portion of the baled material.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A wrapped bale handling apparatus configured to engage a bale and remove a wrap from the bale, the bale having an exterior surface, the wrapped bale handling apparatus comprising:
a bale support assembly including a support frame and a pair of support forks mounted on the support frame and extending forwardly from the support frame in a laterally spaced arrangement, each support fork of the bale support assembly being configured with a first support surface on which to rest the exterior surface of the bale of material to support the bale, the bale support assembly having a support mode and a release mode, the support mode characterized by the supports forks of the bale support assembly being arranged to support a bale by the bale support assembly, the release mode characterized by the support forks of the bale support assembly being arranged to release the bale from being supported by the bale support assembly;

a wrap cutting structure configured to cut the wrap in place on the bale;

a wrap removal assembly configured to remove the wrap from the wrapped bale; and wherein the wrap cutting structure includes a cutting blade mounted on one of the support forks of the bale support assembly and oriented on the support fork such that movement of the bale onto the first support surface of the support fork moves the cutting blade along the bale wrap wrapped about the exterior surface of the bale to cut the bale wrap.

2. The apparatus of claim 1 additionally comprising a mount frame configured to mount on at least one lift arm of a tractor such that the apparatus is raisable and lowerable with respect to a ground surface on which the tractor is rested.

3. The apparatus of claim 1 wherein the support frame has a support condition corresponding to the support mode of the bale support assembly and a release condition corresponding to the release mode of the bale support assembly; and wherein the pair of support forks has a support condition corresponding to the support condition of the support frame and a release condition corresponding to the release condition of the support frame;

wherein the support condition of the support forks is characterized by the lateral spacing between the support forks being relatively smaller and the release condition of the support forks being characterized by the lateral spacing between the support forks being relatively larger.

4. The apparatus of claim 1 additionally comprising a mount frame; and wherein the support frame includes:
a stationary frame portion substantially immovably mounted on the mount frame, one of the support forks being mounted on the stationary frame portion; and
a movable frame portion movably mounted on the stationary frame portion, another one of the support forks being mounted on the movable frame portion.

5. The apparatus of claim 1 wherein the cutting blade of the wrap cutting structure is mounted in a fixed position on the one support fork of the bale support assembly.

6. The apparatus of claim 1 wherein the cutting blade of the wrap cutting structure is fixedly mounted on a distal end of the one support fork.

7. The apparatus of claim 1 wherein the wrap removal assembly includes a wrap gripping structure configured to grip a portion of the wrap about the wrapped bale, the wrap gripping structure being configured to grip the portion of the wrap when the bale support assembly moves from the support mode toward the release mode.

8. The apparatus of claim 7 wherein the wrap gripping structure includes:
a first grip component mounted on the support frame of the bale support assembly and including a first pinch element extending forwardly from support frame to penetrate a wrapped bale supported on the support frame at a location inward from the wrap about the bale; and
a second grip component mounted on the support frame of the bale support assembly and including a second pinch element extending forwardly from support frame adjacent to the first pinch element exterior of the wrapped bale in a manner to position a portion of the wrap between the first and second pinch elements.

9. The apparatus of claim 8 wherein the first and second pinch elements extend substantially parallel to the support forks in positions above at least one of the support forks.

10. The apparatus of claim 8 wherein at least the first pinch element comprises a bale spike.

11. The apparatus of claim 10 wherein the second pinch element comprises a bale spike.

12. The apparatus of claim 8 wherein the wrap gripping structure is configured such that the first and second pinch elements are spaced in the support mode of the bale support assembly.

13. The apparatus of claim 12 wherein the wrap gripping structure is configured such that the first and second pinch elements are moved toward each other when the bale support assembly moves from the support mode toward the release mode.

14. The apparatus of claim 12 wherein the wrap gripping structure is configured such that the first and second pinch elements are moved upwardly away from the pair of support forks when the bale support assembly moves from the support mode toward the release mode.

15. The apparatus of claim 1 wherein the first support surfaces of the pair of support forks are oriented upwardly and inwardly toward each other to supportively engage lower exterior regions of the bale.

16. The apparatus of claim 15 wherein the first support surfaces are concave to engage the lower exterior regions of the bale.

* * * * *